United States Patent [19]

Soltz

[11] Patent Number: 4,868,797
[45] Date of Patent: Sep. 19, 1989

[54] TIME-SHARED AGC FOR ULTRA-SOUND LIQUID LEVEL METER

[75] Inventor: Daniel J. Soltz, Norristown, Pa.

[73] Assignee: Fischer & Porter Company, Warminster, Pa.

[21] Appl. No.: 100,361

[22] Filed: Sep. 23, 1987

[51] Int. Cl.$^4$ .............................................. G01S 15/08
[52] U.S. Cl. ..................................... 367/98; 367/908; 367/902; 73/290 V
[58] Field of Search .................... 367/98, 99, 900, 902, 367/908, 117; 73/290 V; 340/621

[56] References Cited

U.S. PATENT DOCUMENTS 4,578,997  4/1986  Soltz ..................................... 367/908
4,679,175  7/1987  Eder et al. ............................. 367/98

Primary Examiner—Thomas H. Tarcza
Assistant Examiner—Daniel T. Pihulic
Attorney, Agent, or Firm—Michael Ebert

[57] ABSTRACT

An ultrasonic, echo-ranging instrument for measuring liquid level, the instrument including a transducer dispoed at a fixed position directly above the liquid surface. The transducer is excited to emit periodic pulses which are intercepted by the liquid surface as well as by a reference point a fixed distance from the transducer to produce both reference and liquid echo pulses that are returned to the transducer and detected thereby. The respective transit times of the reference echo and the liquid echo pulses are determined, and the ratio between these transit times is computed to provide an output representing the level of liquid. To ensure accurate readings, the reference echo and liquid echo pulses from the transducer are fed to a single automatic gain control circuit whose operation is time shared. Time sharing of the AGC is effected by means of a microcomputer which in the reference mode enables the AGC to effect gain control of the reference echo pulse during a time slot or window that is closed shortly after the first reference pulse is received regardless of its amplitude, the AGC thereafter being enabled in the liquid mode to effect gain control of the liquid echo pulse.

2 Claims, 2 Drawing Sheets

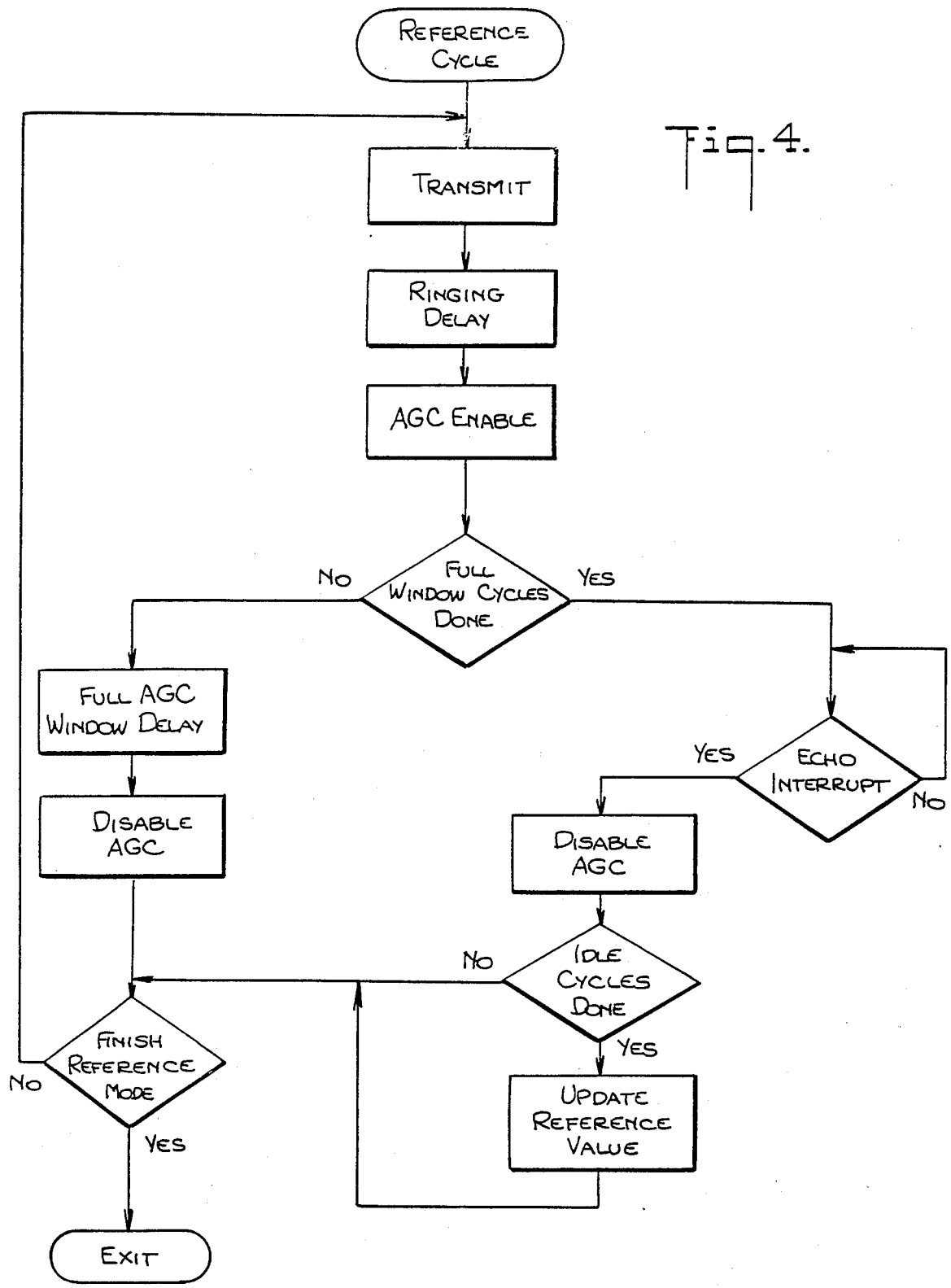

TIME-SHARED AGC FOR ULTRA-SOUND LIQUID LEVEL METER

BACKGROUND OF INVENTION

1. Field of Invention

This invention relates generally to ultrasonic liquid level meters of the echo-ranging type that are compensated for environmental changes, and more particularly to a meter of this type which yields both reference and liquid level echo pulses and which includes a time-shared automatic gain control circuit to derive from these echo pulses, output pulses of constant amplitude to facilitate accurate measurement.

2. Status of Prior Art

In an ultrasonic echo-ranging meter, pulses of ultrasonic energy transmitted from a transducer station placed above the surface of a liquid in a tank or open channel are reflected thereby to produce echo pulses which are received at the station. By determining the round trip transit time of the pulse energy in the gaseous medium above the liquid surface, which transit time depends on the distance between the station and the surface, one is able to provide a reading of liquid level.

The accuracy of an ultrasonic liquid level meter of the echo-ranging type is adversely affected by environmental changes; notably temperature, pressure and chemical composition. These factors alter the velocity of acoustic propagation. For example, the velocity of sound in air at 0° C. is 1,087.42 fps, whereas in carbon dioxide it is 1,106 fps. When a meter is installed in an environment in which the chemical nature of the gaseous medium undergoes change, this factor will disturb the level reading unless means are provided to compensate or correct therefor. Similarly, changes in the temperature of the medium or in ambient pressure adversely affects the accuracy of the instrument.

To provide a reading in an echo-ranging liquid level meter that is independent of changes in the propagation medium (air or other gas), Willis et al. U.S. Pat. No. 3,834,233, discloses a first transducer mounted on top of a tank to direct sound energy down into the tank and to detect an echo from the surface of the liquid therein. To compensate for inaccuracies due to changes in the velocity of the sound, Willis et al. positions a second or reference transducer a fixed distance from the first to detect the transmitted wave. Detected signals derived from the two transducers are processed to cancel the effects of any variation in the velocity of sound due to environmental fluctuations.

In my prior U.S. Pat. No. 4,470,299 (Soltz), compensation for environmental changes is effected by a reflector fixedly positioned to intercept and reflect energy from a side portion of the radiation field pattern of the transmitted beam to produce a reference echo signal which in no way interferes with the main liquid level echo signal derived from transmitted energy in a path normal to the surface of the liquid.

In the system disclosed in my prior '299 patent, the transducer is excited to emit periodic pulses which are directed along a center path toward the liquid surface and reflected to produce liquid echo pulses which return to the transducer and are detected thereby. The reference reflector which is placed at a predetermined position relative to the transducer intercepts energy from a side path in the radiation pattern of the transducer to return it to the transducer to produce reference echo pulses. Means are provided to determine the transit time along the center path and along the side path. The ratio of the reference side path and center path transit times is computed to provide an output representing the level of liquid independent of changes in the gaseous environment.

In prior art ultrasonic meters such as those disclosed in the Tankin U.S. Pat. No. 3,090,224, the Kritz U.S. Pat. No. 2,949,772, the Kohno U.S. Pat. No. 4,183,244 and the Asada U.S. Pat. No. 3,710,021, use is made of an automatic gain control circuit in conjunction with the received signals. Automatic gain is generally effected by a control circuit adapted to automatically modify the amplification gain of a receiver in a manner whereby the desired output signal remains at a constant amplitude despite variations in input signal strength.

In an ultrasonic echo-ranging liquid level meter, variations in the amplitude of the echo pulses received from the surface of the liquid are encountered by reason of changes in this surface as well as changes in distance due to liquid level changes. Thus an echo pulse which has a long distance to travel before reaching the transducer will be weaker than an echo pulse traveling a shorter distance.

But in the context of an echo-ranging system of the type disclosed in my prior patent '299 ; in which reference echo pulses as well as liquid level echo pulses are received, at first blush it would appear that no need exists for automatic gain control with respect to the reference echo pulses. Because these pulses are derived from a reflector having a smooth surface placed a fixed distance from the transducer, all reference echo pulses should have the same strength.

However, typical ultrasonic transducers of the same model, though seemingly alike, nevertheless differ somewhat in sensitivity and exhibit a wide spread in echo response. Thus when manufacturing ultrasonic echo-ranging instruments, all of which incorporate the same model of transducer, it becomes necessary to make an individual gain setting to match a particular transducer to the instrument.

Hence in an environmentally-compensated ultrasonic instrument of the type disclosed in m prior '299 patent in which reference as well as liquid level echo pulses are received, actually two automatic gain control functions are needed: one for the reference echo pulses, and the other for the liquid level pulses.

To obviate the need for two automatic gain control circuits in an instrument of the type disclosed in my prior '299 patent, my subsequent U.S. Pat. No. 4,578,997 (Soltz), makes use of a single automatic gain control circuit that is time shared to effect separate gain control for operation in the reference mode and in the liquid level or target mode. In the arrangement disclosed in my '997 patent, the AGC is enabled in a reference mode during a time slot or window having a predetermined duration to effect gain control for the reference echo pulses, and the AGC is thereafter similarly enabled in the target mode to effect gain control for the liquid echo pulses.

We have since found that while the time-shared AGC arrangement disclosed in my prior '997 patent in most cases gives rise to a considerable improvement, there are remaining cases where the reference echo pulse signal shape causes the AGC to favor the reference echo pulse of highest amplitude which is not necessarily the first reference echo pulse. This results in an error in the reference distance count and therefore produces a significant error in level measurements.

SUMMARY OF INVENTION

In view of the foregoing, the main object of this invention is to provide an ultrasonic instrument of the echo-ranging type for metering liquid level wherein reference echo pulses as well as the liquid level pulses are subjected to automatic gain control (AGC) to afford output pulses of constant amplitude to facilitate accurate measurement, a single AGC circuit being used which is time shared by the reference echo an liquid echo pulses.

While the invention will be described in conjunction with an environmentally-compensated ultrasonic instrument which uses a side reflector to produce the reference echo pulses, it is to be understood that the invention is also useful with other forms of such instruments which produce reference echo pulses as well as liquid level echo pulses, such as those disclosed in the Massa U.S. Pat. No. 4,210,967; the Willis et al. U.S. Pat. No. 3,834,233; and the Adams et al. U.S. Pat. No. 4,130,018.

More particularly, an object of this invention is to provide an instrument of the above-type which makes use of a single automatic gain control circuit that is time shared to effect separate gain control for operation in the reference mode and in the liquid level or target mode, time sharing being effected by a microprocessor which enables the AGC as to cause it to respond only to the first received reference pulse regardless of its amplitude.

Briefly stated, these objects are attained in an ultrasonic, echo-ranging instrument for measuring liquid level, the instrument including a transducer disposed at a fixed position directly above the liquid surface. The transducer is excited to emit periodic pulses which are intercepted by the liquid surface as well as by a reference point a fixed distance from the transducer to produce both reference and liquid echo pulses that are returned to the transducer and detected thereby. The respective transit times of the reference echo and the liquid echo pulses are determined, and the ratio between these transit times is computed to provide an output representing the level of liquid. To ensure accurate readings, the reference echo and liquid echo pulses from the transducer are fed to a single automatic gain control circuit whose operation is time shared. Time sharing of the AGC is effected by means of a microcomputer which in the reference mode enables the AGC to effect gain control of the reference echo pulse during a time slot or window that is closed shortly after the first reference pulse is received regardless of its amplitude, the AGC thereafter being enabled in the liquid level mode to effect gain control of the liquid echo pulse.

OUTLINE OF DRAWINGS

For a better understanding of the invention as well as other objects and further features thereof, reference is made to the following detailed description to be read in conjunction with the accompanying drawings, wherein:

FIG. 4 is the algorithm for controlling the reference pulse window.

DESCRIPTION OF INVENTION

Figure 1:
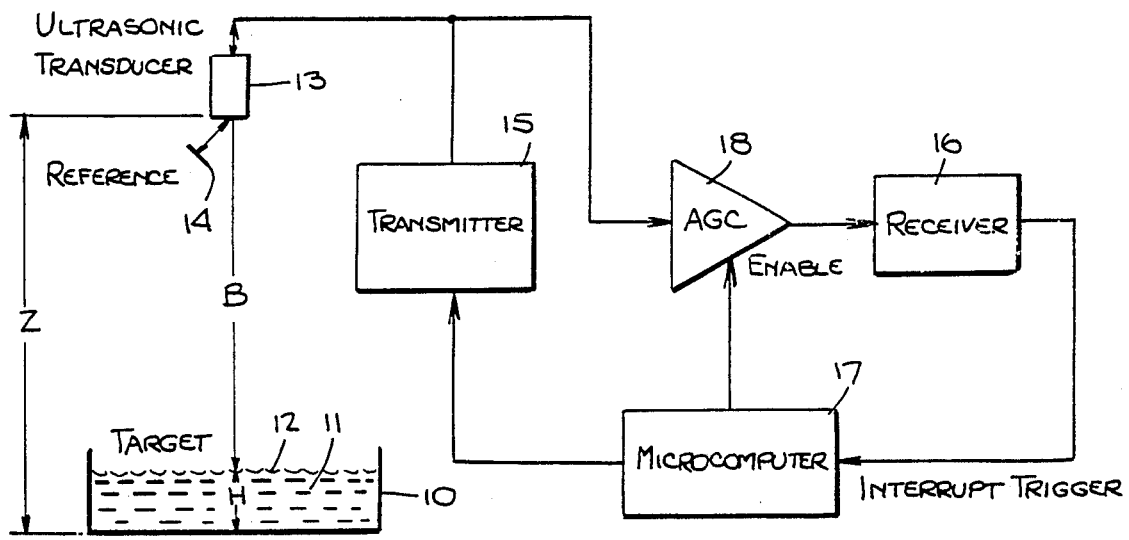
FIG. 1 is a block diagram of a time-shared AGC for an ultrasonic liquid level meter of the echo-ranging type in accordance with the invention.

Referring now to FIG. 1, there is shown an open trough or channel 10 through which liquid 11 flows, the instrument in accordance with the invention serving to measure the level H of liquid in the channel. By placing a dam in the channel, the level of liquid attained downstream of the dam will depend on flow rate; hence by measuring this liquid level one can also determine the flow rate. In practice, instead of an open channel the liquid whose level is to be measured may be that held in a process tank or other container. Consequently the atmosphere above the surface of the liquid is not necessarily pure air and may include ammonia, carbon dioxide and other gases.

Mounted above channel 10 at a station having a fixed distance Z from the bottom of the channel is an ultrasonic transducer 13. This may take the form of a piezoelectric transducer, a ceramic electrostatic unit or any other element capable of generating ultrasonic energy of adequate strength. The straight line distance B between the face of transducer 13 and the surface 12 of the liquid depends on the varying level H of the liquid. Thus the value of Z is constant, whereas the relative values of H and B vary but always add up to value Z.

The field radiation pattern produced by an ultrasonic transducer is related to the ratio of the transducer's ultrasonic wavelength to its diameter. Thus large diameter-to-wavelength ratio produces a relatively narrow field pattern and a small ratio, a broad field pattern.

The field pattern produced by transducer 13 includes a center beam path which extends vertically from the transducer face to the surface of the liquid and is normal thereto. The center beam path represents the shortest distance between the transducer and the liquid surface, for all other paths in the radiation field pattern more or less diverge from normal and represent progressively longer distances.

Placed at a fixed distance from transducer 13 at a position to intercept a side path of energy in the radiation pattern is a reflector 14. The reflector produces an echo pulse that is returned to the transducer, its time of transit being a function of the distance of the reflector from the transducer and of the velocity of sound in the gaseous medium.

Transducer 13 is excited periodically by a transmitter 15, causing the transducer to emit periodic pulses of ultrasonic energy in the desired field pattern. The transmitted energy is propagated through the gaseous medium between the transducer and the liquid surface and it is directed toward the surface where it is reflected and returned to the transducer which now acts as a detector whose output is coupled to a receiver 16. In practice, a limiting diode is provided to protect receiver 16 from transducer 13 when it is being excited.

Each transmitted pulse is first followed in time by a reference echo pulse, for the reference distance from the transducer is shorter than the distance to the liquid surface. The reference echo pulse is followed by a liquid level pulse which is received over the center path, the shortest distance to the liquid surface. Actually, the instrument alternates between two modes; namely, reference and target. Each mode includes many consecutive transmit-receive cycles which are needed to establish a average value that corresponds to the particular mode.

The counter means by which one determines the transit time of ultrasonic pulse energy in its round trip from transducer 13 to the liquid surface target and the transit time in its round trip from the transducer to the reference point is set forth in detail in my prior '299 patent and will therefore not be repeated. The counts representing the liquid target transit time and the reference transit time are applied to a microcomputer 17 which determines the ratio of the reference and target transit times to yield an output count representing liquid level independent of the environmental changes.

In the arrangement shown in FIG. 1, an automatic gain control circuit 18 is interposed between transducer 13 and receiver 16, this circuit being enabled by microcomputer 17, which also controls the operation of transmitter 15. In the reference mode, the AGC is enabled only during time slot or windows corresponding to the reference mode during which a reference echo pulse is received. During target mode, the AGC is enabled during time windows corresponding to the target mode during which a liquid level echo pulse is received. The microcomputer is programmed to provide enabling signals to the AGC to establish these two time windows.

Figure 2:
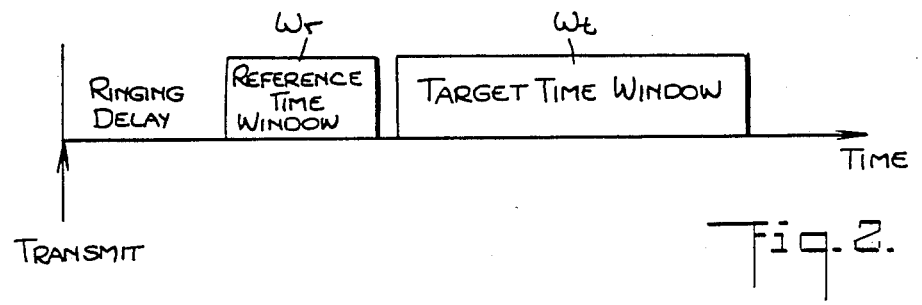
FIG. 2 is a timing diagram of the system in an initial phase of operation.

In operation, as shown in FIG. 2 by the timing diagram, the microcomputer begins an instrument cycle with a trigger actuating transmitter 15 to drive transducer 13, thereby producing an ultrasonic transmit pulse. After a brief ringing-decay-delay, the microcomputer enables AGC 18 during the time window $W_r$ for the reference mode. All echoes received during this time slot will affect the AGC gain level, which in turn conditions the proper echo pulse to be detected, to thereby establish a reference count. This transmit-receive cycle is repeated many times until the reference mode has been completed.

The target mode operation is carried out in a manner similar to the reference mode, except that in this case, the AGC is enabled during the liquid target mode window $W_t$.

Because the AGC requires updating each time a change in mode is effected—and this cannot be done instantaneously—it is necessary to disregard all echoes which are received while the AGC gain level is being updated. Thus, during the reference mode, the microcomputer is programmed to disregard the first several reference counts before computing an average reference value, and in the target mode the first several target counts are disregarded before computing an average target value. When valid reference and target data is available to provide the reference and target transit times, the ratio of these times is computed to provide accurate level or flow rate data.

As pointed out previously, there are some cases in a time-shared AGC arrangement of the above-described type where the shape of the receiving reference echo pulse will cause the AGC to favor an echo pulse of the highest amplitude rather than the first to be received, with a consequent error in the reference distance count.

Figure 3:
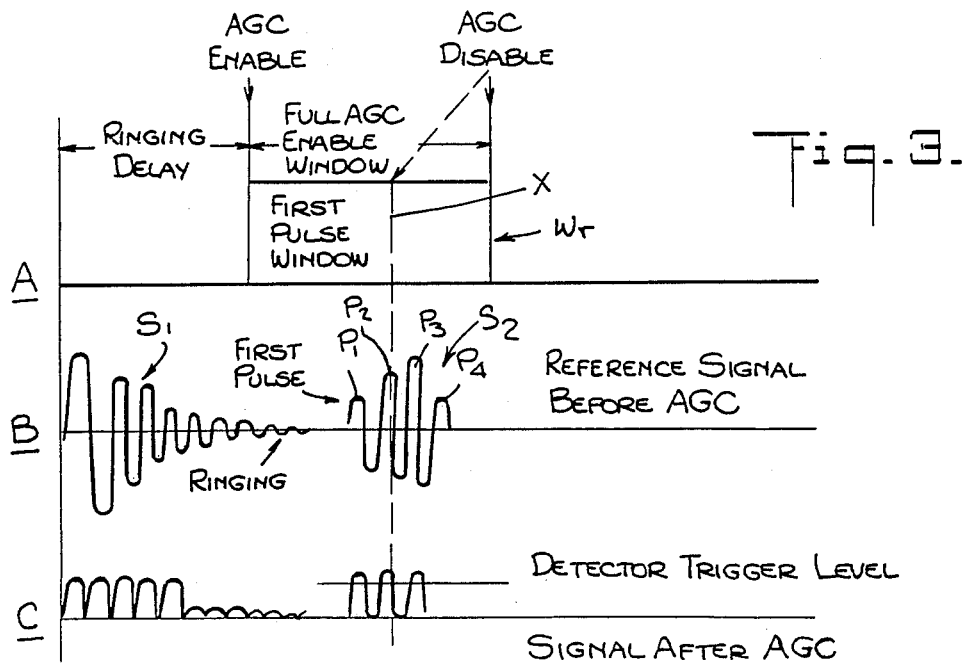
FIG. 3 illustrates the relationship of the reference time window in the timing diagram to the reference echo pulses before and after AGC.

To explain why this problem arises, reference is made to FIG. 3, which on line A shows the reference time window $W_r$ as having a leading edge which represents the instant that AGC 18 is enabled by microprocessor 17 and a trailing edge representing the instant the AGC is disabled. The time interval between these edges represents the period during which the reference window is open.

On line B, there is shown two incoming reference signals $S_1$ and $S_2$ as they are received in succession before being subjected to AGC. Each signal is composed of a series of more or less high amplitude reference echo pulses followed by a damped wave of ringing pulses of low amplitude. The time position of window $W_r$ is such as to admit the reference signal and to exclude all ringing pulses except for those of extremely low amplitude insufficient to have any effect on the AGC circuit.

However, as shown by reference signal $S_2$ which is composed of a series of pulses; namely, first pulse $P_1$, second pulse $P_2$, third pulse $P_3$ and fourth pulse $P_4$, these pulses differ in amplitude. The pulse of highest amplitude is not the first pulse $P_1$ but the third in the series, $P_3$. If, therefore, the AGC responds not to pulse $P_1$ but jumps to pulse $P_3$, an error will arise in the reference distance count.

To overcome this pulse "jump" problem, the AGC gain must be specifically tailored to the first pulse. An obvious solution to this problem would be to close window $W_r$ after a first pulse trigger takes place. However, due to the existence of a residual transducer ringing signal, this first pulse response could latch onto the ringing signal while ignoring the subsequent true reference echo pulse.

To solve this problem, microprocessor 17 is programmed to cause the reference mode during which signals from target 14 are received to last, say, 2 seconds, during which time transducer 13 transmits and receives a reference echo every 50 ms for a total of 40 cycles. Two seconds is given by way of example, but the duration of the reference mode must be such to include a large number of cycles.

For the initial series of several echos, he AGC enable window $W_r$ is kept open for the full duration of an expected echo signal, as shown in line A of FIG. 3. However, while this might result in a second pulse trigger rather than a first pulse trigger, in this initial phase of operation, all trigger pulses are ignored by the AGC and hence an error does not arise. At the conclusion of this initial phase in the reference mode, the AGC enable window $W_r$, as indicated by dashed line X, is closed just after the first pulse $P_1$ trigger; hence the AGC responds to the first pulse and not to a subsequent pulse, even if the subsequent pulse is of higher amplitude.

In practice, the second pulse $P_2$ is also admitted before the window is closed so as to limit AGC gain whereby it will not latch onto any ringing pulses. In line 3 of FIG. 3, the trigger level of the reference signals, after being subjected to AGC, is illustrated. It will be seen that the maximum amplitude of the pulses is at a constant level.

Thus initially the AGC disable signal is generated after a predetermined fixed full window period in the reference mode for the initial series of cycles in the reference signal. Thereafter, for the remaining cycles in the reference mode, the AGC disable is governed by the first received echo pulse that interrupts microcomputer 17, the initial series of reference cycles being ignored to allow the AGC to tailor its gain to the following first pulse before updating the reference value. This is repeated until the end of the reference mode operation.

FIG. 4 shows the algorithm of the reference cycle program.

While there has been shown and described a preferred embodiment of a time-shared AGC for ultra-sound liquid level meter in accordance with the invention, it will be appreciated that many changes and modifications may be made therein without, however, departing from the essential spirit thereof.

I claim:

1. An ultrasonic echo-ranging system in which acoustic energy is propagated at a velocity that depends on a gaseous environment subject to changes which affect the velocity of acoustic propagation to measure a liquid level in an open channel or other liquid container located in said gaseous environment, said system comprising:

(A) an ultrasonic transducer having a diverging radiation field pattern disposed at a fixed position directly above the liquid, the gaseous environment therebetween determining the velocity of ultrasonic energy propagated therethrough;

(B) means to excite the transducer to emit periodic pulses of ultrasonic energy which are directed toward the surface of the liquid and reflected from this target to produce liquid echo pulses which return to the transducer and are detected thereby;

(C) reference means at a fixed point relative to the transducer to intercept energy emitted from a side path in the radiation pattern of said transducer to intercept energy emitted form said transducer and return it to the transducer to produce reference echo signals, each signal being constituted by a series of pulses of varying amplitude, said series including a first pulse;

(D) receiver means coupled to the transducer to derive therefrom at different times said reference echo signals and said liquid echo pulses, said receiver means including automatic gain control means responsive to said liquid echo pulses and said reference echo signals to produce output pulses of constant amplitude representing the reference echo signals and said liquid echo pulses, said automatic gain control means being constituted by a single automatic gain control which is enabled during a first time slot subsequent to the emission of a transducer pulse to operate on the received reference echo signal and during a later second time slot to operate on the received liquid echo pulse whereby the operation of the control is time shared;

(E) measuring means responsive to the output pulses to measure the time elapsed between the emitted transducer pulse and a subsequent reference echo signal to determine the reference transit time, and to measure the time elapsed between the emitted transducer pulse and a subsequent liquid echo pulse to determine the target transmit time; and (F) a microcomputer coupled to the measuring means to calculate a ratio existing between the reference and target transit times and to yield an output representing the level of the liquid independent of changes in the gaseous environment, said time slots being created by said computer which is so programmed to control said automatic gain control after a predetermined time interval during which several cycles of ultrasonic energy pulses are emitted by the transducer and are detected thereby, to define a reference time window which is closed a predetermined interval after the first pulse in the series thereof in the reference signal is received regardless of its amplitude, and a subsequent liquid echo pulse window to admit the liquid echo pulse.

2. A system as set forth in claim 1, wherein said reference means is a reflector.

* * * * *

UNITED STATES PATENT AND TRADEMARK OFFICE
CERTIFICATE OF CORRECTION

PATENT NO. : 4,868,797
DATED : September 19, 1989
INVENTOR(S) : Daniel J. Soltz

It is certified that error appears in the above-identified patent and that said Letters Patent are hereby corrected as shown below:

Column 7, line 26, "form" should read --from--

Signed and Sealed this

Seventh Day of August, 1990

*Attest:*

HARRY F. MANBECK, JR.

*Attesting Officer*  *Commissioner of Patents and Trademarks*